United States Patent
Graf (10) Patent No.: US 12,484,127 B2
(45) Date of Patent: Nov. 25, 2025

(54) LIGHTING DEVICE

(71) Applicant: ZKW Group GmbH, Wieselburg (AT)

(72) Inventor: Harald Graf, Würflach (AT)

(73) Assignee: ZKW Group GmbH, Wieselburg (AT)

( * ) Notice: Subject to any disclaimer, the term of this patent is extended or adjusted under 35 U.S.C. 154(b) by 141 days.

(21) Appl. No.: 18/384,934

(22) Filed: Oct. 30, 2023

(65) Prior Publication Data

US 2024/0155753 A1 May 9, 2024

(30) Foreign Application Priority Data

Nov. 8, 2022 (EP) .................................... 22206132

(51) Int. Cl.
*H05B 45/46* (2020.01)
*B60Q 1/04* (2006.01)
*H05B 45/14* (2020.01)

(52) U.S. Cl.
CPC ............... *H05B 45/46* (2020.01); *B60Q 1/04* (2013.01); *H05B 45/14* (2020.01)

(58) Field of Classification Search
CPC ...... H05B 45/46; H05B 45/14; H05B 45/375; H05B 45/03; B60Q 1/04; G09G 3/32
See application file for complete search history.

(56) References Cited

U.S. PATENT DOCUMENTS

| 6,404,274 | B1 | 6/2002 | Hosono et al. | |
| 11,051,382 | B2 * | 6/2021 | Derks | H02M 3/1582 |
| 2006/0022214 | A1 * | 2/2006 | Morgan | H05B 45/40 257/E25.032 |
| 2014/0292220 | A1 * | 10/2014 | Trattler | H05B 45/46 323/283 |
| 2015/0312983 | A1 * | 10/2015 | Hu | H01R 43/00 315/186 |

(Continued)

FOREIGN PATENT DOCUMENTS

| CN | 107757464 A * | 3/2018 | B60Q 1/1415 |
| EP | 3255959 A1 | 12/2017 | |

OTHER PUBLICATIONS

Extended European Search Report forEuropean Patent Application No. 22206132.7, dated Apr. 18, 2023 (16 Pages).

(Continued)

*Primary Examiner* — Abdullah A Riyami
*Assistant Examiner* — Syed M Kaiser
(74) *Attorney, Agent, or Firm* — Eversheds Sutherland (US) LLP (57) ABSTRACT

The disclosure relates to a lighting device (1) that includes (i) a multi-LED chip (2), wherein the multi-LED chip (2) has a plurality of LED light sources (2') as well as a plurality of regulating elements (2"), wherein each LED light source (2') is assigned a regulating element (2") connected in series for regulating the current consumption of the respective LED light source (2') and together with the regulating element (2") forms a controllable string (2a, 2b, 2c), wherein each LED light source (2') is designed to be individually switchable; and (ii) an electrical control unit (3), which has a step-down converter (3a) with a voltage input (3aVin), a feedback input (3aFB) and a voltage output (3aVout) and a microcontroller (3b) with a signal input (3bSin) and a signal output (3bSout).

15 Claims, 4 Drawing Sheets

(56) References Cited

U.S. PATENT DOCUMENTS

| | | | |
|---|---|---|---|
| 2016/0044753 A1* | 2/2016 | Lee | H05B 45/20 |
| | | | 315/250 |
| 2016/0096467 A1 | 4/2016 | Murakami et al. | |
| 2020/0281061 A1* | 9/2020 | Derks | H05B 45/3725 |
| 2021/0376731 A1* | 12/2021 | Bayer | H02M 1/0043 |
| 2022/0026052 A1* | 1/2022 | Keller | F21S 8/006 |
| 2022/0141373 A1* | 5/2022 | Brunk | H05K 7/2039 |
| | | | 348/143 |
| 2022/0312561 A1* | 9/2022 | Bruvier | H05B 45/345 |
| 2023/0108612 A1 | 4/2023 | Ota et al. | |

OTHER PUBLICATIONS

Roberts, S., "DC/DC Book of Knowledge Practical Tips for the User", RECOM, 2014.

* cited by examiner

LIGHTING DEVICE

CROSS-REFERENCE TO RELATED APPLICATIONS

This application claims priority to European Patent Application No. 22206132.7, filed Nov. 8, 2022, which is incorporated herein by reference.

FIELD OF THE INVENTION AND DESCRIPTION OF PRIOR ART

The invention relates to a lighting device, comprising a multi-LED chip, wherein the multi-LED chip has a plurality of LED light sources as well as a plurality of regulating elements, wherein each LED light source is assigned a regulating element connected in series for regulating the current consumption of the respective LED light source and together with the regulating element forms a controllable string, wherein each LED light source is designed to be individually switchable, an electrical control unit, which has a step-down converter with a voltage input, a feedback input and a voltage output and a microcontroller with a signal input and a signal output, wherein the step-down converter is designed to convert a DC input voltage present at the voltage input into a lower DC output voltage and to output it via the voltage output, wherein the voltage output for electrically supplying the strings of the multi-LED chip is connected to the multi-LED chip, wherein the voltage value of the DC output voltage is determined by a feedback loop in which a voltage component of the DC output voltage is fed back to the feedback input and the DC output voltage is adjusted as a function of the fed-back voltage component, wherein the microcontroller is designed to receive an input signal via the signal input and to convert it into an output signal, with which output signal the light image to be emitted by the multi-LED chip can be preset, wherein each light image to be emitted correlates with a configuration of control states of the strings and wherein the signal output is connected to the multi-LED chip for transmitting the output signal.

Lighting devices of this type are being used more and more. In order to ensure the correct operation of the lighting device, it has been common practice to simply set the operating voltage provided for the respective components of the lighting device such that this is sufficient to adequately supply all operating modes of the lighting device. Efficiency improvements of such lighting devices have previously been achieved by selecting the components used, the efficiency of the light sources as well as the downstream optics and by optimizing the utilisation of the emitted light.

SUMMARY OF THE INVENTION

It is an object of the invention to further improve the efficiency of such lighting devices.

This object is achieved with a lighting device of the type mentioned in the introduction, in which according to the invention the multi-LED chip is further designed to derive the corresponding control states of the strings for each light image and to differentiate between strings to be activated and those not to be activated, to calculate a required minimum operating voltage for each string to be activated from the control states derived for each light image taking into account the voltage losses of the regulating elements and by comparing the minimum operating voltages of the strings to be activated to determine the highest minimum operating voltage for each light image and to set it as the setpoint operating voltage for the light image in question and to communicate this setpoint operating voltage to the microcontroller, wherein the microcontroller is designed to manipulate the voltage feedback of the voltage component into the feedback input as a function of the setpoint operating voltage communicated by the multi-LED chip in such a way that only the setpoint operating voltage is output as output voltage to the voltage output. The number of strings is at least two, but it can be significantly higher in practice and, for example, be any natural number between 2 and 500, in particular between 30 and 100. The specific number of strings depends on the resolution to be achieved by the respective lighting device, wherein each string represents at least one pixel of an emitted light image. For simplified control of the individual LED light sources, the number of strings can also be a plurality of $2^n$, where n corresponds to the number of digits of a binary number. Thanks to the invention, the operating voltage of the multi-LED chip is variably adapted to the requirements of the multi-LED chip or the light distribution to be emitted. In this way, it is possible to only supply the voltage required for operation and to avoid surplus voltage components that would otherwise be generated in the multi-LED chip as loss voltage or would be specifically regulated away by regulating components of the multi-LED chip (and thus converted into heat loss). This results in improved efficiency of the lighting device.

The regulating element can, for example, be a linear regulator whose resistance value can be adjusted. Alternatively, a switch and/or a combination of switches with resistive components is also conceivable (possibly formed by a transistor). In particular, it can be provided that the microcontroller is connected to a resistor network that can be switched by the microcontroller for manipulating the voltage feedback of the voltage component into the feedback input, wherein the switchable resistor network is connected to the feedback input and thus to the voltage feedback of the voltage component. This creates a particularly robust and cost-effective option for manipulating the voltage feedback and the resulting voltage output. It can advantageously be provided that the resistor network is designed as an R2R network. In particular, it can be provided that the R2R network has four switching stages, which are respectively connected to the microcontroller for controlling the switching stages. This means that 16 different switching states and corresponding output voltages can be achieved.

It can further be provided that the output voltage is fed back to the feedback input via a voltage divider. This type of feedback is particularly robust and cost-effective. It can be provided that the voltage divider is connected to earth and the resistor network engages at a node between the resistors of the voltage divider and is also connected to earth.

It can further be provided that the lighting device further has an application-specific IC, wherein this application-specific IC is connected to the signal output of the microcontroller and is designed to convert the output signal into control signals for controlling the LED light sources of the multi-LED chip.

In particular, it can be provided that the output voltage is between 3V and 5V, in particular between 3.5V and 4.5V.

It can further be provided that the input signal contains information about the current light image and the light image to be emitted subsequently, and based thereon, the associated setpoint operating voltage of the subsequent light image is derived in advance in order to preset the setpoint operating voltage suitable for this light image by the microcontroller immediately at the time of the change to the subsequent light image. In this way, time delays can be minimized, in particular any necessary readjustments in the emission if, for example, the subsequent light image requires a higher setpoint operating voltage and the insufficient setpoint operating voltage of the previous light image would otherwise still be present for a short time in the transition until the higher setpoint operating voltage is set.

In particular, it can be provided that the microcontroller is designed to store the setpoint voltage values preset for recurring light images by the multi-LED chip and to set and maintain the stored setpoint voltage value corresponding to a preset light image in advance until another light image is preset or a setpoint voltage value deviating from the stored setpoint voltage value is output by the multi-LED chip for the light image in question. Afterwards, the stored value is overwritten and the changed setpoint is adopted. A lookup table can be used to access the stored setpoint voltage values, for instance. Additionally or alternatively, the setpoint voltage values can also be determined by a calculation.

The recurring light images for which the setpoint voltage values are stored can, for example, be the x most frequent light images or the light functions associated with these light images, wherein x is a natural number and can, for example, be between 3 and 20. The functions can be, for example, a dipped beam function, full beam function, parking light function, cornering light function, etc.

Furthermore, the invention relates to a motor vehicle headlight, comprising a lighting device according to the invention.

The invention also relates to a motor vehicle, comprising a lighting device according to the invention and/or a motor vehicle headlight according to the invention.

The invention further relates to a method for the energy-efficient operation of a lighting device, wherein the lighting device comprises the following: a multi-LED chip, wherein the multi-LED chip has a plurality of LED light sources as well as a plurality of regulating elements, wherein each LED light source is assigned a regulating element connected in series for regulating the current consumption of the respective LED light source and together with the regulating element forms a controllable string, wherein each LED light source is designed to be individually switchable, an electrical control unit, which has a step-down converter with a voltage input, a feedback input and a voltage output and a microcontroller with a signal input and a signal output, wherein the step-down converter is designed to convert a DC input voltage present at the voltage input into a lower DC output voltage and to output it via the voltage output, wherein the voltage output for electrically supplying the strings of the multi-LED chip is connected to the multi-LED chip, wherein the voltage value of the DC output voltage is determined by a feedback loop in which a voltage component of the DC output voltage is fed back to the feedback input and the DC output voltage is adjusted as a function of the fed-back voltage component, wherein the microcontroller is designed to receive an input signal via the signal input and to convert it into an output signal, with which output signal the light image to be emitted by the multi-LED chip can be preset, wherein each light image to be emitted correlates with a configuration of control states of the strings and wherein the signal output is connected to the multi-LED chip for transmitting the output signal, wherein the method comprises the following steps: a) receiving an output signal by the multi-LED chip, b) deriving the respective light image to be emitted from the output signal and calculating the corresponding control states of the strings, c) calculating on the basis of the control states determined in step b) a minimum operating voltage required for each string taking into account the voltage losses of the regulating elements, d) determining the setpoint operating voltage by determining the highest of the minimum operating voltages of the strings, e) communicating the setpoint operating voltage to the microcontroller, f) manipulating the voltage feedback of the voltage component into the feedback input by the microcontroller as a function of the setpoint operating voltage communicated in such a way that only the setpoint operating voltage is output as output voltage to the voltage output.

All technical features of the lighting devices described in this document can, of course, also be implemented in the method mentioned and vice versa.

BRIEF DESCRIPTION OF THE FIGURES

The invention is outlined in more detail below based on exemplary and non-limiting embodiments, which are illustrated in the figures. In the figures

DETAILED DESCRIPTION OF EMBODIMENTS OF THE INVENTION

In the following figures, unless otherwise stated, the same reference numbers denote the same features.

Figure 1:
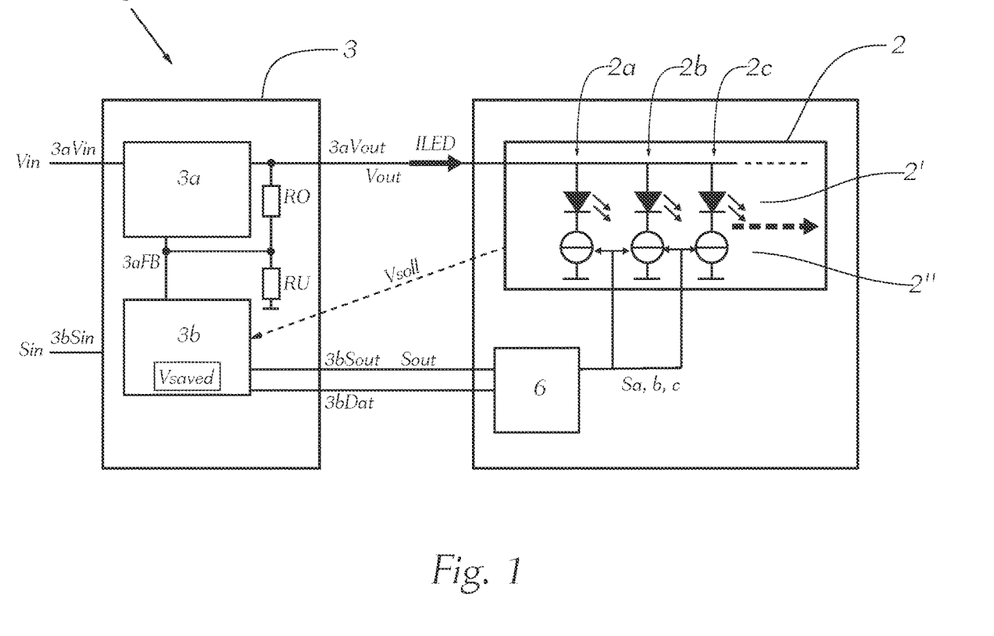
FIG. 1 shows an illustration of an exemplary embodiment of a lighting device according to the invention.

FIG. 1 shows an illustration of an exemplary embodiment of a lighting device 1 according to the invention. The lighting device 1 comprises a multi-LED chip 2, wherein the multi-LED chip 2 has a plurality of LED light sources 2' as well as a plurality of regulating elements 2", wherein each LED light source 2' is assigned a regulating element 2" connected in series for regulating the current consumption of the respective LED light source 2' and together with the regulating element 2" forms a controllable string 2a, 2b, 2c. Each LED light source 2' is designed to be individually switchable. Complex light images can be generated in this way. Only three strings are explicitly shown in the illustration in FIG. 1. It goes without saying that this number can be varied as desired and can be selected by a person skilled in the art to suit the respective purpose of the lighting device.

The lighting device 1 further comprises an electrical control unit 3. The control unit 3 in turn comprises a step-down converter 3a with a voltage input 3aVin, a feedback input 3aFB and a voltage output 3aVout. The control unit 3 further comprises a microcontroller 3b with a signal input 3bSin and a signal output 3bSout.

Figure 2:
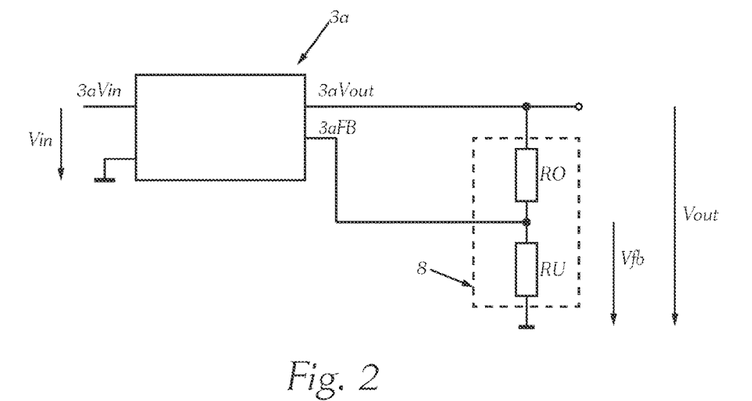
FIG. 2 shows a schematic illustration of an exemplary step-down converter, which can be used in the present invention.

The step-down converter 3a is designed to convert a DC input voltage Vin present at the voltage input 3aVin into a lower DC output voltage Vout and to output it via the voltage output 3aVout. One example of such a step-down converter is shown in FIG. 2. With reference to FIG. 1, it should further be mentioned that the voltage output 3aVout for electrically supplying the strings 2a, 2b, 2c of the multi-LED chip 2 is connected to the multi-LED chip 2, wherein the voltage value of the DC output voltage Vout is determined by a feedback loop in which a voltage component Vfb of the DC output voltage Vout is fed back to the feedback input 3aFB and the DC output voltage Vout is adjusted as a function of the fed-back voltage component Vfb. The microcontroller 3b is designed to receive an input signal Sin via the signal input 3bSin and to convert it into an output signal Sout. The input signal Sin can, for example, come from the control unit of the communication bus of a vehicle and enter the control unit 3. The output signal Sout is used to preset the light image 4a, 4b to be emitted by the multi-LED chip 2, wherein each light image 4a, 4b to be emitted correlates with a configuration of control states of the strings 2a, 2b, 2c and wherein the signal output 3bSout is connected to the multi-LED chip 2 for transmitting the output signal Sout. Various communication systems can be used for signal transmission, such as bus systems, in particular CAN, GMSL and/or LVDS. A data interface 3bDat is also provided to adjust settings on the multi-LED chip 2 or read out status parameters, for example. This data interface can, for example, comprise a UART, SPI or I2C interface. The status parameters can, for example, comprise temperature parameters or performance parameters. The data interface 3bDat advantageously enables bidirectional data communication, whereby data can be transferred from the microcontroller to the multi-LED chip 2 directly or indirectly via the circuit 6 described later on. The multi-LED chip 2 is further designed to derive the corresponding control states of the strings 2a, 2b, 2c for each light image 4a, 4b (see FIGS. 3a and 3b) and to differentiate between strings 2a, 2b, 2c to be activated and those not to be activated, to calculate a required minimum operating voltage Vmin2a, Vmin2b, Vmin2c for each string 2a, 2b, 2c to be activated from the control states derived for each light image 4a, 4b taking into account the voltage losses of the regulating elements 2" and by comparing the minimum operating voltages Vmin2a, Vmin2b, Vmin2c of the strings 2a, 2b, 2c to be activated to determine the highest minimum operating voltage for each light image 4a, 4b.

The required minimum operating voltage of an individual string can, for example, be calculated based on a voltage measurement in part of the string. The part can, for example, comprise the LED light source 2' itself or the associated regulating element 2".

This highest minimum operating voltage can in turn be determined as the setpoint operating voltage Vsetpoint for the light image in question and be communicated to the microcontroller 3b, which in turn ensures that the output voltage Vout assumes this setpoint operating voltage. For this, the microcontroller 3b is designed to manipulate the voltage feedback of the voltage component Vfb into the feedback input 3aFB as a function of the setpoint operating voltage Vsetpoint communicated by the multi-LED chip 2 in such a way that only the setpoint operating voltage Vsetpoint is output as output voltage Vout to the voltage output 3aVout. In this way, it can be avoided that excessive voltage values have to be consumed at the control elements 2". The lighting device thus has increased efficiency. Vsetpoint can be transmitted by the multi-LED chip 2 to the microcontroller 3b via a separate line or via the data interface 3bDat. It is possible that the microcontroller 3b requests the setpoint operating voltage Vsetpoint and thus triggers the determination of the highest minimum operating voltage. This can occur at regular intervals or advantageously always after or at the same time as presetting a new light image 4a, 4b to be emitted.

Figure 3A:
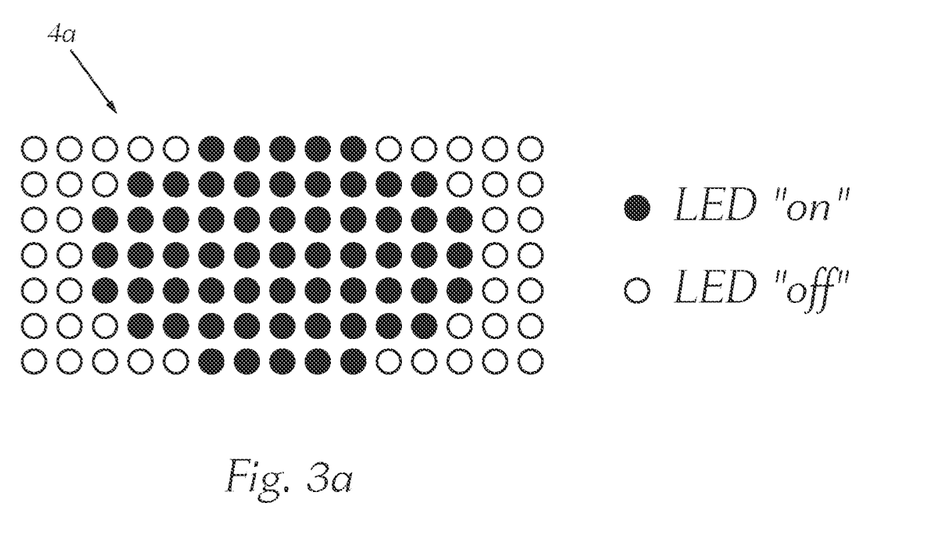
FIGS. 3a and 3b show exemplary light images, which can be generated by the lighting device.
Figure 3B:
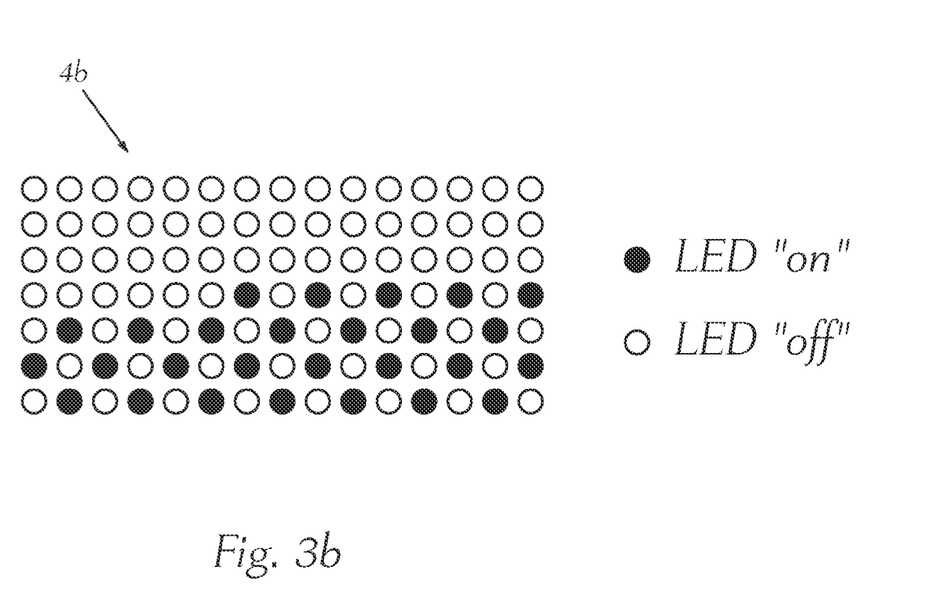
Figure 4:
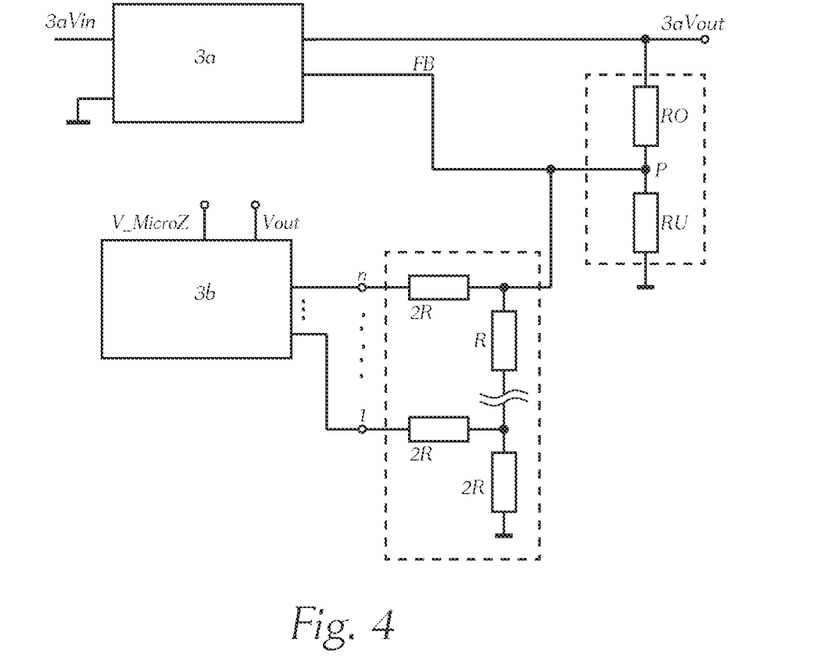
FIG. 4 shows an exemplary embodiment of the invention with an R2R network.

FIGS. 3a and 3b show exemplary light images, which can be generated by an embodiment of the lighting device 1 according to the invention. The lighting device 1 has a total of 105 strings, which are arranged in a matrix comprising seven rows and fifteen columns. The resolution is 7×15 and the number of "pixels" of the light images is 105. FIG. 3a shows various light distributions. In both light images, not all LED light sources 2' or strings are switched on. Different light images usually result in different setpoint operating voltages. The reason for this are, for example, temperature differences or manufacturing tolerances within the number of LED light sources 2' of the multi-LED chip 2. FIG. 4 shows an exemplary embodiment of the invention with an R2R network. The microcontroller 3b is connected to a resistor network 5 that can be switched by the microcontroller 3b for manipulating the voltage feedback of the voltage component Vfb into the feedback input 3aFB, wherein the switchable resistor network 5 is connected to the feedback input 3aFB and thus to the voltage feedback of the voltage component Vfb. The resistor network 7 is designed as an R2R network.

The resistor network can also be formed by a plurality of resistors, which are connected in parallel to one another and to the resistor RU, wherein each of the resistors and also the resistor RU can be assigned an electronic switch, for example a switching transistor, which can activate or deactivate the respective resistor in the resistor network. If one resistor or more resistors are deactivated by the respective associated switching transistor, the voltage feedback of the voltage component Vfb is manipulated. The switching transistors associated with the plurality of resistors can be controlled by the microcontroller 3b.

Alternatively, the microcontroller can be connected to an adjustable resistor for manipulating the voltage feedback of the voltage component into the feedback input, wherein the adjustable resistor is connected to the feedback input and thus to the voltage feedback of the voltage component. Such an adjustable resistor is advantageously designed as a transistor, which is connected to the microcontroller such that the resistance value of the transistor can be adjusted via the microcontroller. The adjustable resistor can be used instead of the resistor RU.

Figure 5:
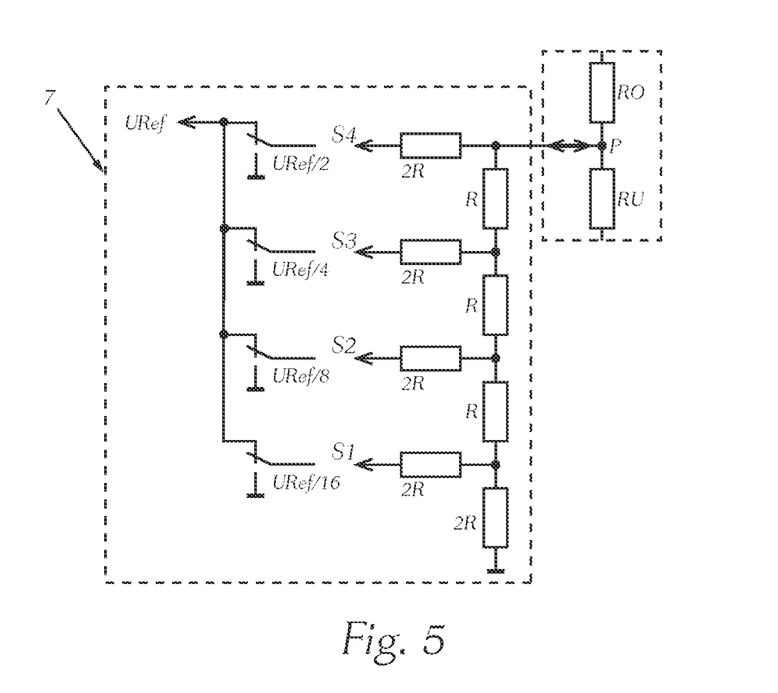
FIG. 5 shows a detailed illustration of an R2R network with four switching stages, including an indication of the connection to the embodiment according to FIG. 4.

FIG. 5 shows a detailed illustration of an R2R network with four switching stages, incl. indicating a connection to the embodiment according to FIG. 4. The R2R network has four switching stages S1, S2, S3, S4, which are respectively connected to the microcontroller 3b for controlling the switching stages S1, S2, S3, S4, wherein the resistor network engages the resistor RU and is connected to earth as well as a to a reference voltage URef.

There is no need to discuss the technical function of such a resistor network in detail here. This is sufficiently known to a person skilled in the art. The microcontroller 3b selectively connects the connections (Bit0-Bit3 or S1 to S4) of the R2R network to e.g. +5V or to GND via push-pull connections and then couples the output voltage to RU.

By combining the switch positions S1 to S4, a total of 16 different states can be brought about, which can be fed back to the step-down converter 3a via the feedback area FB. The output voltage Vout can thus be manipulated in 16 stages by such a resistor network according to FIG. 5.

The output voltage Vout or a portion thereof is fed back to the feedback input 3aVin via a voltage divider 8. The voltage divider 8 is connected to earth and the resistor network 7 engages at the node P (see FIG. 4) between the resistors RO and RU of the voltage divider 8 and is also connected to earth.

The lighting device 1 further preferably in accordance with FIG. 1 has an application-specific integrated circuit (e.g. ASIC or FPGA) 6, wherein this circuit 6 is connected to the signal output 3*b*Sout of the microcontroller 3*b* and is designed to convert the output signal Sout into control signals Sa,b,c for controlling the LED light sources of the multi-LED chip 2.

The output voltage Vout can, for example, be between 3V and 5V, in particular between 3.5V and 4.5V.

It can advantageously be provided that the input signal Sin contains information about the current light image 4*a*, 4*b* and the light image 4*a*, 4*b* to be emitted subsequently, and based thereon, the associated setpoint operating voltage Vsetpoint of the subsequent light image 4*a*, 4*b* is derived in advance in order to preset the setpoint operating voltage Vsetpoint suitable for this light image 4*a*, 4*b* by the microcontroller 3*b* immediately at the time of the change to the subsequent light image 4*a*, 4*b*. In this way, time delays can be minimized, in particular any necessary readjustments in the emission if, for example, the subsequent light image requires a higher setpoint operating voltage Vsetpoint and the insufficient setpoint operating voltage Vsetpoint of the previous light image would otherwise still be present for a short time in the transition until the higher setpoint operating voltage is set.

It can further be provided that the microcontroller 3*b* is designed to store the setpoint voltage values Vsetpoint preset for recurring light images 4*a*, 4*b* by the multi-LED chip 2 and to set and maintain the stored setpoint voltage value Vsaved (see FIG. 1) corresponding to a preset light image 4*a*, 4*b* in advance until another light image 4*a*, 4*b* is preset or a setpoint voltage value Vsetpoint deviating from the stored setpoint voltage value Vsaved is output by the multi-LED chip 2 for the light image 4*a*, 4*b* in question.

Figure 6:
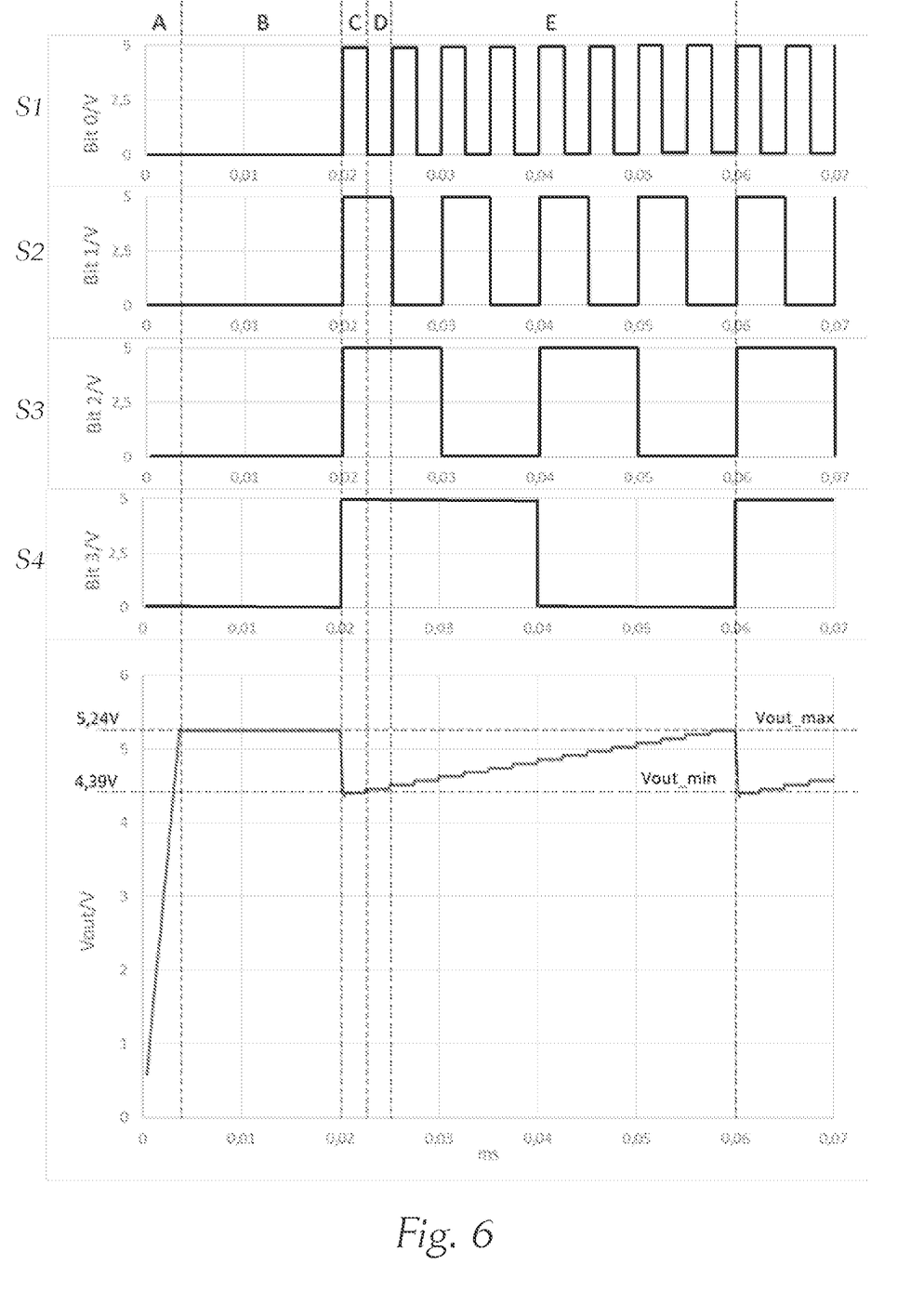
FIG. 6 shows exemplary output voltages for various switching states of the switching stages according to FIG. 5.

FIG. 6 shows exemplary output voltages for various switching states of the switching stages S1 to S4 according to FIG. 5. In the time period C, the R2R network is in operation, wherein all switches S1 to S4 are active and thus the voltage values measured at the switch inputs S1 to S4 are respectively the voltage value of URef, e.g. 5V here. In this way, the potential of the node P (see FIG. 4) is raised to the maximum. Due to the connection of the feedback into the feedback input FB, the output voltage Vout thereby assumes a minimum and is 4.39 V. In the time period D, the switch S1 is deactivated, which represents the least significant bit (also known as Bit 0). The node P (see FIG. 4) voltage thus increases by the smallest possible voltage jump. In the time period E, all of the remaining switch combinations are run through until the end of the time period E, when all switches S1 to S4 are switched off. The highest output voltage in the form of 5.24 V is achieved.

The invention also comprises a motor vehicle headlight having at least one lighting device 1 according to the invention. The invention further comprises a motor vehicle having at least one lighting device 1 according to the invention and/or at least one motor vehicle headlight according to the invention.

The invention further relates to a method for the energy-efficient operation of a lighting device 1, in particular a lighting device of the type mentioned above, the lighting device 1 comprising a multi-LED chip 2, wherein the multi-LED chip 2 has a plurality of LED light sources 2' as well as a plurality of regulating elements 2", wherein each LED light source 2' is assigned a regulating element 2" connected in series for regulating the current consumption of the respective LED light source 2' and together with the regulating element 2" forms a controllable string 2*a*, 2*b*, 2*c*, wherein each LED light source 2' is designed to be individually switchable, an electrical control unit 3, which has a step-down converter 3*a* with a voltage input 3*a*Vin, a feedback input 3*a*FB and a voltage output 3*a*Vout and a microcontroller 3*b* with a signal input 3*b*Sin and a signal output 3*b*Sout, wherein the step-down converter 3*a* is designed to convert a DC input voltage Vin present at the voltage input 3*a*Vin into a lower DC output voltage Vout and to output it via the voltage output 3*a*Vout, wherein the voltage output 3*a*Vout for electrically supplying the strings 2*a*, 2*b*, 2*c* of the multi-LED chip 2 is connected to the multi-LED chip 2, wherein the voltage value of the DC output voltage Vout is determined by a feedback loop in which a voltage component Vfb of the DC output voltage Vout is fed back to the feedback input 3*a*FB and the DC output voltage Vout is adjusted as a function of the fed-back voltage component Vfb, wherein the microcontroller 3*b* is designed to receive an input signal Sin via the signal input 3*b*Sin and to convert it into an output signal Sout, with which output signal Sout the light image 4*a*, 4*b* to be emitted by the multi-LED chip 2 can be preset, wherein each light image 4*a*, 4*b* to be emitted correlates with a configuration of control states of the strings 2*a*, 2*b*, 2*c* and wherein the signal output 3*b*Sout is connected to the multi-LED chip 2 for transmitting the output signal Sout.

The method comprises the following steps: a) receiving an output signal Sout by the multi-LED chip 2, b) deriving the respective light image 4*a*, 4*b* to be emitted from the output signal Sout and calculating the corresponding control states of the strings 2*a*, 2*b*, 2*c*, c) calculating on the basis of the control states determined in step b a minimum operating voltage Vmin2*a*, Vmin2*b*, Vmin2*c* required for each string 2*a*, 2*b*, 2*c* taking into account the voltage losses of the regulating elements 2", d) determining the setpoint operating voltage Vsetpoint by determining the highest of the minimum operating voltages Vmin2*a*, Vmin2*b*, Vmin2*c* of the strings 2*a*, 2*b*, 2*c*, e) communicating the setpoint operating voltage Vsetpoint to the microcontroller 3*b*, f) manipulating the voltage feedback of the voltage component Vfb into the feedback input 3*a*FB by the microcontroller 3*b* as a function of the setpoint operating voltage Vsetpoint communicated in such a way that only the setpoint operating voltage Vsetpoint is output as output voltage Vout to the voltage output 3*a*Vout.

The invention is not limited to the embodiments shown, but is defined by the entire scope of protection of the claims. Individual aspects of the invention or embodiments may also be adopted and combined with each other. Any reference numbers in the claims are exemplary and merely serve to make the claims easier to read, without limiting them.

The invention claimed is:

1. A lighting device (1), comprising:
   a multi-LED chip (2), wherein the multi-LED chip (2) has
      a plurality of LED light sources (2') as well as a plurality of regulating elements (2"), wherein each LED light source (2') is assigned a regulating element (2") connected in series for regulating the current consumption of the respective LED light source (2') and together with the regulating element (2") forms a controllable string (2*a*, 2*b*, 2*c*), wherein each LED light source (2') is designed to be individually switchable;
   an electrical control unit (3), which has:
      a step-down converter (3*a*) with a voltage input (3*a*Vin), a feedback input (3*a*FB) and a voltage output (3*a*Vout), and
      a microcontroller (3*b*) with a signal input (3*b*Sin) and a signal output (3*b*Sout), wherein the step-down converter (3a) is configured to convert a DC input voltage (Vin) present at the voltage input (3a Vin) into a lower DC output voltage (Vout) and to output it via the voltage output (3aVout), wherein the voltage output (3aVout) for electrically supplying the strings (2a, 2b, 2c) of the multi-LED chip (2) is connected to the multi-LED chip (2), wherein the voltage value of the DC output voltage (Vout) is determined by a feedback loop in which a voltage component (Vfb) of the DC output voltage (Vout) is fed back to the feedback input (3aFB) and the DC output voltage (Vout) is adjusted as a function of the fed-back voltage component (Vfb), wherein the microcontroller (3b) is configured to receive an input signal (Sin) via the signal input (3bSin) and to convert it into an output signal (Sout), with which output signal (Sout) a light image (4a, 4b) to be emitted by the multi-LED chip (2) can be preset, wherein each light image (4a, 4b) to be emitted correlates with a configuration of control states of the strings (2a, 2b, 2c) and wherein the signal output (3bSout) is connected to the multi-LED chip (2) for transmitting the output signal (Sout), wherein the multi-LED chip (2) is further configured to derive the corresponding control states of the strings (2a, 2b, 2c) for each light image (4a, 4b) and to differentiate between strings (2a, 2b, 2c) to be activated and those not to be activated, to calculate a required minimum operating voltage (Vmin2a, Vmin2b, Vmin2c) for each string (2a, 2b, 2c) to be activated from the control states derived for each light image (4a, 4b) taking into account the voltage losses of the regulating elements (2") and by comparing the minimum operating voltages (Vmin2a, Vmin2b, Vmin2c) of the strings (2a, 2b, 2c) to be activated to determine the highest minimum operating voltage for each light image (4a, 4b) and to set it as the setpoint operating voltage (Vsetpoint) for the light image (4a, 4b) in question and to communicate this setpoint operating voltage (Vsetpoint) to the microcontroller (3b), wherein the microcontroller (3b) is designed to manipulate the voltage feedback of the voltage component (Vfb) into the feedback input (3aFB) as a function of the setpoint operating voltage (Vsetpoint) communicated by the multi-LED chip (2) in such a way that only the setpoint operating voltage (Vsetpoint) is output as output voltage (Vout) to the voltage output (3aVout), and wherein the lighting device (1) further has an application-specific IC (6), wherein this application-specific IC (6) is connected to the signal output (3bSout) of the microcontroller (3b) and is designed to convert the output signal (Sout) into control signals (Sa,b,c) for controlling the LED light sources of the multi-LED chip (2).

2. The lighting device according to claim 1, wherein the microcontroller (3b) is connected to a resistor network (5) that can be switched by the microcontroller (3b) for manipulating the voltage feedback of the voltage component (Vfb) into the feedback input (3aFB), wherein the switchable resistor network (5) is connected to the feedback input (3aFB) and thus to the voltage feedback of the voltage component (Vfb).

3. The lighting device (1) according to claim 2, wherein the resistor network (7) is designed as an R2R network.

4. The lighting device (1) according to claim 3, wherein the R2R network has four switching stages (S1, S2, S3, S4), which are respectively connected to the microcontroller (3b) for controlling the switching stages (S1, S2, S3, S4).

5. The lighting device (1) according to claim 1, wherein the output voltage (Vout) is fed back to the feedback input (3aVin) via a voltage divider (8).

6. The lighting device (1) according to claim 5, wherein the voltage divider (8) is connected to earth and the resistor network (7) engages at a node (P) between the resistors (RO, RU) of the voltage divider (8) and is also connected to earth.

7. The lighting device (1) according to claim 1, wherein the output voltage (Vout) is between 3V and 5V.

8. The lighting device (1) according to claim 1, wherein the input signal (Sin) contains information about the current light image (4a, 4b) and the light image (4a, 4b) to be emitted subsequently, and based thereon, the associated setpoint operating voltage (Vsetpoint) of the subsequent light image (4a, 4b) is derived in advance in order to preset the setpoint operating voltage (Vsetpoint) suitable for this light image (4a, 4b) by the microcontroller (3b) immediately at the time of the change to the subsequent light image (4a, 4b).

9. The lighting device (1) according to claim 1, wherein the microcontroller (3b) is configured to store the setpoint voltage values (Vsetpoint) preset for recurring light images (4a, 4b) by the multi-LED chip (2) and to set and maintain the stored setpoint voltage value (Vsaved) corresponding to a preset light image (4a, 4b) in advance until another light image (4a, 4b) is preset or a setpoint voltage value (Vsetpoint) deviating from the stored setpoint voltage value (Vsaved) is output by the multi-LED chip (2) for the light image (4a, 4b) in question.

10. A motor vehicle headlight, comprising the lighting device (1) according to claim 1.

11. A motor vehicle, comprising the lighting device (1) according to claim 1.

12. A method for the energy-efficient operation of a lighting device (1), wherein the lighting device (1) comprises:

a multi-LED chip (2), wherein the multi-LED chip (2) has a plurality of LED light sources (2') as well as a plurality of regulating elements (2"), wherein each LED light source (2') is assigned a regulating element (2") connected in series for regulating the current consumption of the respective LED light source (2') and together with the regulating element (2") forms a controllable string (2a, 2b, 2c), wherein each LED light source (2') is designed to be individually switchable; and an electrical control unit (3), which has (i) a step-down converter (3a) with a voltage input (3aVin), a feedback input (3aFB) and a voltage output (3aVout), and (ii) a microcontroller (3b) with a signal input (3bSin) and a signal output (3bSout), wherein the step-down converter (3a) is configured to convert a DC input voltage (Vin) present at the voltage input (3aVin) into a lower DC output voltage (Vout) and to output it via the voltage output (3aVout), wherein the voltage output (3aVout) for electrically supplying the strings (2a, 2b, 2c) of the multi-LED chip (2) is connected to the multi-LED chip (2), wherein the voltage value of the DC output voltage (Vout) is determined by a feedback loop in which a voltage component (Vfb) of the DC output voltage (Vout) is fed back to the feedback input (3aFB) and the DC output voltage (Vout) is adjusted as a function of the fed-back voltage component (Vfb), wherein the microcontroller (3b) is configured to receive an input signal (Sin) via the signal input (3bSin) and to convert it into an output signal (Sout), with which output signal (Sout) a light image (4a, 4b) to be emitted by the multi-LED chip (2) can be preset, wherein each light image (4a, 4b) to be emitted correlates with a configuration of control states of the strings (2a, 2b, 2c) and wherein the signal output (3bSout) is connected to the multi-LED chip (2) for transmitting the output signal (Sout), and wherein the lighting device (1) further has an application-specific IC (6), wherein this application-specific IC (6) is connected to the signal output (3bSout) of the microcontroller (3b) and is designed to convert the output signal (Sout) into control signals (Sa,b,c) for controlling the LED light sources of the multi-LED chip (2), the method comprising:

a) receiving the output signal (Sout) by the multi-LED chip (2);
b) deriving the respective light image (4a, 4b) to be emitted from the output signal (Sout) and calculating the corresponding control states of the strings (2a, 2b, 2c);
c) calculating on the basis of the control states determined in step b) a minimum operating voltage (Vmin2a, Vmin2b, Vmin2c) required for each string (2a, 2b, 2c) taking into account the voltage losses of the regulating elements (2");
d) determining the setpoint operating voltage (Vsetpoint) by determining the highest of the minimum operating voltages (Vmin2a, Vmin2b, Vmin2c) of the strings (2a, 2b, 2c);
e) communicating the setpoint operating voltage (Vsetpoint) to the microcontroller (3b); and
f) manipulating the voltage feedback of the voltage component (Vfb) into the feedback input (3aFB) by the microcontroller (3b) as a function of the setpoint operating voltage (Vsetpoint) communicated in such a way that only the setpoint operating voltage (Vsetpoint) is output as output voltage (Vout) to the voltage output (3aVout).

13. A lighting device (1), comprising:

a multi-LED chip (2), wherein the multi-LED chip (2) has a plurality of LED light sources (2') as well as a plurality of regulating elements (2"), wherein each LED light source (2') is assigned a regulating element (2") connected in series for regulating the current consumption of the respective LED light source (2') and together with the regulating element (2") forms a controllable string (2a, 2b, 2c), wherein each LED light source (2') is designed to be individually switchable;

an electrical control unit (3), which has:
  a step-down converter (3a) with a voltage input (3aVin), a feedback input (3aFB) and a voltage output (3aVout), and
  a microcontroller (3b) with a signal input (3bSin) and a signal output (3bSout), wherein the step-down converter (3a) is configured to convert a DC input voltage (Vin) present at the voltage input (3aVin) into a lower DC output voltage (Vout) and to output it via the voltage output (3aVout), wherein the voltage output (3aVout) for electrically supplying the strings (2a, 2b, 2c) of the multi-LED chip (2) is connected to the multi-LED chip (2), wherein the voltage value of the DC output voltage (Vout) is determined by a feedback loop in which a voltage component (Vfb) of the DC output voltage (Vout) is fed back to the feedback input (3aFB) and the DC output voltage (Vout) is adjusted as a function of the fed-back voltage component (Vfb), wherein the microcontroller (3b) is configured to receive an input signal (Sin) via the signal input (3bSin) and to convert it into an output signal (Sout), with which output signal (Sout) a light image (4a, 4b) to be emitted by the multi-LED chip (2) can be preset, wherein each light image (4a, 4b) to be emitted correlates with a configuration of control states of the strings (2a, 2b, 2c) and wherein the signal output (3bSout) is connected to the multi-LED chip (2) for transmitting the output signal (Sout), wherein the multi-LED chip (2) is further configured to derive the corresponding control states of the strings (2a, 2b, 2c) for each light image (4a, 4b) and to differentiate between strings (2a, 2b, 2c) to be activated and those not to be activated, to calculate a required minimum operating voltage (Vmin2a, Vmin2b, Vmin2c) for each string (2a, 2b, 2c) to be activated from the control states derived for each light image (4a, 4b) taking into account the voltage losses of the regulating elements (2") and by comparing the minimum operating voltages (Vmin2a, Vmin2b, Vmin2c) of the strings (2a, 2b, 2c) to be activated to determine the highest minimum operating voltage for each light image (4a, 4b) and to set it as the setpoint operating voltage (Vsetpoint) for the light image (4a, 4b) in question and to communicate this setpoint operating voltage (Vsetpoint) to the microcontroller (3b), wherein the microcontroller (3b) is designed to manipulate the voltage feedback of the voltage component (Vfb) into the feedback input (3aFB) as a function of the setpoint operating voltage (Vsetpoint) communicated by the multi-LED chip (2) in such a way that only the setpoint operating voltage (Vsetpoint) is output as output voltage (Vout) to the voltage output (3aVout), wherein the microcontroller (3b) is connected to a resistor network (5) that can be switched by the microcontroller (3b) for manipulating the voltage feedback of the voltage component (Vfb) into the feedback input (3aFB), wherein the switchable resistor network (5) is connected to the feedback input (3aFB) and thus to the voltage feedback of the voltage component (Vfb), and wherein the resistor network (7) is designed as an R2R network, which has four switching stages (S1, S2, S3, S4), which are respectively connected to the microcontroller (3b) for controlling the switching stages (S1, S2, S3, S4).

14. A motor vehicle headlight, comprising the lighting device (1) according to claim 13.

15. The lighting device (1) according to claim 7, wherein the output voltage (Vout) is between 3.5V and 4.5V.

* * * * *